3,275,462
CELLULOSE ACETATE TEXTILE TREATED WITH
α-CYANO-β,β-DIALKYL ACRYLATE
Albert F. Strobel, Delmar, and Sigmund C. Catino, Castleton, N.Y., assignors to General Aniline & Film Corporation, New York, N.Y., a corporation of Delaware
No Drawing. Filed Apr. 5, 1963, Ser. No. 270,802
19 Claims. (Cl. 106—196)

This invention relates to textile materials and more particularly to the stabilization and improved dyeability of textiles having a base of cellulose acetate of high acetyl value.

Cellulose acetate of high acetyl value, and particularly those above about 55% calculated as combined acetic acid, has been known to undergo substantial degradation which is particularly emphasized in a fading and general deterioration of dyestuffs used to color the cellulose acetate. It has been found that particularly with the dispersed acetate dyes such as the dispersed azo and anthraquinone dyes, the fading of the dyestuff on the textile material is much more pronounced in the highly acetylated products than in the lower acetylated cellulose. Thus, dyed fibers containing below about 2.5 acetyl groups per cellulose unit (about 55% calculated as combined acetic acid) are much more stable than similar dyeings on fibers of higher acetyl values. Not only do the dyes degrade but there is also a degradation of the fiber itself even in the absence of the dyestuff.

It has now been found that cellulose acetate of high acetyl values, i.e., above about 2.5 acetyl groups per cellulose moiety, can be stabilized against degradation whether dyed or undyed, by treating the fibers with α-cyanoacrylic compounds hereinafter to be described. It has also been found that such compounds acts as valuable and improved dye assistants whereby better dyeings are obtainable under less stringent conditions.

It is therefore an object of the present invention to provide stabilized cellulose acetate compositions.

It is another object of this invention to provide compositions containing high acetyl cellulose acetate which are stable against degradation.

It is still another object of this invention to provide stabilized dyed cellulose acetate compositions.

It is a further object of this invention to provide compositions of high acetyl dyed cellulose acetate which are stable against fading and degradation.

It is a still further object of this invention to provide processes for the stabilization of dyed or undyed cellulose acetate, and particularly of high acetyl cellulose acetate.

It is still another further object of this invention to provide improved processes for dyeing cellulose acetate.

Other objects will appear hereinafter as the description proceeds.

The stabilization of the high acetyl cellulose acetate is accomplished by incorporating into the material a sufficient amount of cyanoacrylic compound of the following general formula:

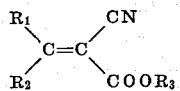

wherein $R_1$ and $R_2$ represent alkyl and preferably lower alkyl of from 1 to about 12 carbon atoms, and $R_3$ represents alkyl or substituted alkyl of from 1 to about 50 carbon atoms and alkenyl of from 3 to about 50 carbon atoms. Among representative substituted alkyls mention may be made of hydroxy alkyl, haloalkyl, alkoxyalkyl, carbalkoxyalkyl, cyanoalkyl, aralkyl, aryloxyalkyl, and the like.

The following represents suitable substituents for $R_1$, $R_2$ and $R_3$.

alkyl
    methyl
    ethyl
    n-propyl
    iso-propyl
    n-butyl
    iso-butyl
    tertiary-butyl
    secondary-butyl
    n-amyl
    iso-amyl
    tertiary-amyl and the other isomeric amyls
    n-hexyl
    iso-hexyl and the other isomeric hexyls
    n-heptyl
    iso-heptyl and the other isomeric heptyls
    n-primary nonyl (nonyl-1)
        nonyl-(2)
        nonyl-(3)
        nonyl-(5)
    2-methyl-octyl-2
    4-ethyl-heptyl-2
    2-methyl-4-ethyl-hexyl-4
    n-primary octyl
        octyl-(2) (caprylyl)
    2-methyl-3-ethyl-pentyl-3
    2,2,4-trimethyl-pentyl-4
    2-ethyl-hexyl-1
    3-ethyl-hexyl-3
    2-methyl-heptyl-2
    3-methyl-heptyl-3
    4-methyl-heptyl-4
    n-primary decyl (decyl-1)
    decyl-4 (secondary decyl)
    2-ethyl-octyl-3 (tertiary decyl)
    4-propyl-heptyl-4 (tertiary decyl)
    undecyl-1 (n-primary decyl)
    undecyl-2 (n-secondary decyl)
    dodecyl-1 (n-dodecyl)
    tridecyl-1 (n-tridecyl)
    tridecyl-7
    3-ethyl-undecyl
    tetradecyl-1 (n-tetradecyl)
    pentadecyl-1 (n-pentadecyl)
    pentadecyl-8
    hexadecyl (cetyl)
    heptadecyl-9
    octadecyl-1
    2-methyl heptadecyl-2
    eicosyl-1
    docosyl-1
    tricosyl-12
    tetracosyl
    tricapryl
    pentacosyl
    hexacosyl
    heptacosyl
    octacosyl
    nonacosyl
    myrisyl (30 carbons)
alkenyl
    allyl ($CH_2=CHCH_2-$)
    methallyl ($CH_2=C(CH_3)CH_2-$)
    crotyl ($CH_3CH=CHCH_2-$)
    butenyl-1 ($CH_2=CH-CH-CH_3$)
    butenyl-2
    γ-isopropyl allyl
    β-ethyl-γ-propyl allyl 2-methyl-octenyl-6
decenyl-1
decenyl-2
undecenyl
dodecenyl-2
octadecenyl
docosenyl
pentamethyl eicosenyl
substituted alkyls, e.g.,
  cyanoethyl
  cyanopropyl(n)
  cyanoisopropyl
  cyanobutyl(n)
  cyanoisobutyl
  cyanoamyl(n)
  cyanoisoamyl
  cyanohexyl
  cyanoheptyl
  cyanononyl
  cyanodecyl
  cyanolauryl, and the like.
  hydroxyethyl
  hydroxypropyl (n-propyl, isopropyl)
  hydroxybutyl (n-butyl, isobutyl, etc.)
  hydroxyamyl
  hydroxyhexyl
  hydroxydecyl
  hydroxylauryl, and the like.
  chloroethyl
  chloropropyl (n-propyl, isopropyl)
  chlorobutyl (n-butyl, isobutyl, etc.)
  chloroamyl
  chlorohexyl
  chlorodecyl
  chlorolauryl, and the like.
  bromoethyl
  bromopropyl (n-propyl, isopropyl)
  bromobutyl (n-butyl, isobutyl, etc.)
  bromoamyl
  bromohexyl
  bromodecyl
  bromolauryl, and the like.
  methoxyethyl
  methoxypropyl (n-propyl, isopropyl)
  methoxybutyl (n-butyl, isobutyl, etc.)
  methoxyamyl
  methoxyhexyl
  methoxydecyl
  methoxylauryl, and the like.
  ethoxyethyl
  ethoxypropyl (n-propyl, isopropyl)
  ethoxybutyl (n-butyl, isobutyl, etc.)
  ethoxyamyl
  ethoxyhexyl
  ethoxydecyl
  ethoxylauryl, and the like.
  carbomethoxy ethyl
  carbomethoxypropyl
  carbomethoxybutyl
  carbomethoxyamyl
  carbomethoxyhexyl, etc.
  carbethoxyethyl
  carbethoxypropyl
  carbethoxybutyl
  carbethoxyamyl
  carbethoxyhexyl, etc.
  carbopropoxyethyl
  carbopropoxypropyl
  carbopropoxybutyl
  carbopropoxyamyl
  carbopropoxyhexyl, etc.
  carbobutoxyethyl
  carbobutoxypropyl
  carbobutoxybutyl
  carbobutoxyamyl
  carbobutoxyhexyl, etc.
  phenoxymethyl
  phenoxyethyl
  phenoxypropyl
  phenoxybutyl
  phenoxyamyl
  phenoxyhexyl, etc.
  toloxymethyl
  toloxyethyl
  toloxypropyl
  toloxybutyl
  toloxyamyl
  xyloxyhexyl, etc.
  hydroxyethoxypropyl
  hydroxyethoxybutyl
  hydroxyethoxyamyl, etc.
  hydroxypropoxyethyl
  hydroxypropoxypropyl
  hydroxypropoxybutyl
  hydroxypropoxyamyl, etc.
  hydroxybutoxyethyl
  hydroxybutoxypropyl
  hydroxybutoxybutyl
  hydroxybutoxyamyl, etc.
substituted alkenyls
  2-chloroallyl
  3-chloroallyl
  3,3-dichloroallyl
  2,3-dichloroallyl
  2'-bromoallyl
  2-iodoallyl
  1-chlorobutenyl-(1)
  2-chlorobutenyl-(1)
  4-chlorobutenyl-(1)
  4-bromobutenyl-(1)
  2-chloro-4-bromobutenyl-(1)
  1,2,-dichloro-4-bromobutenyl-(1)
  1,4-dibromobutenyl-(1)
  2,4-dibromobutenyl-(1)
  2-chlorcrotyl
  3-chlorcrotyl
  4-chlorcrotyl
  2,4-dichlorocrotyl
  1,2-bromocrotyl
  3-chloromethallyl
  3,3-dichloromethallyl
  1,2-dibromopentenyl-(1)
  2,3-dibromoheptenyl-(2)
aralkyl, such as:
  benzyl
  phenethyl
  o-chlorobenzyl
  p-chlorobenzyl
  o-methoxybenzyl
  p-ethoxybenzyl
  o-cyanobenzyl
  p-cyanobenzyl
  o-chlorophenethyl
  p-bromophenethyl
  p-n-propoxyphenethyl, and the like.

The cyanoacrylic compounds above described are extremely efficient for the contemplated purposes of preventing degradation in exeremely small amounts. Quantities from about 0.1 to about 5% may be used and from about 0.5% to about 2% covers the preferred range.

In order to incorporate the above described stabilizers into the cellulose acetates, various techniques may be employed. The stabilizer may be added directly to the acetate dope before spinning into fibers or before the dope is formed into any desired shape. Alternatively, the fibers or other structural form of the acetate may be impregnated with the stabilizer from a suitable bath in which the stabilizer is soluble or dispersed. The latter technique is most advantageously employed where the fiber is to be dyed and from one bath both the stabilizer and dyestuff may be applied simultaneously. This technique is particularly advantageous because the stabilizers herein contemplated also acts as dye assistants when the cellulose acetate is dyed from a bath containing the dispersed dyestuff. The dyestuff may also be employed in solution in a suitable solvent along with the stabilizer.

The dyestuffs which are employed in the dyeing of the acetate compositions and in the processes of the present invention may be any of the conventional products used for dyeing the highly acetylated cellulose acetate. As pointed out above, these include not only the azo and anthraquinone dyestuffs but in addition cationic dyestuffs and many triphenyl methane dyes. Among suitable azo and anthraquinone compounds, any of those disclosed in U.S. Patent 3,016,280 may be used, and the disclosure of such dyestuffs in that patent is incorporated herein by reference thereto.

Although the present invention has been described in connection with high acetyl cellulose acetate it is, of course, obvious that it is also applicable to blends of fibers and to textiles made up of different fibers wherein the cellulose acetate is to be stabilized in the dyed or undyed state.

The following examples will serve to illustrate the present invention. Parts are by weight unless otherwise indicated.

*Example 1*

A fabric composed of cellulose acetate (55% combined acetic acid) which has been previously dyed with Celliton Fast Blue AF Extra Conc. (C.I. 61,115) is immersed in an aqueous bath at a temperature of 180° F. containing 2% of 2-ethylhexyl α-cyano-β-methyl-β-ethylacrylate and 0.1% of Monopol oil. The fabric, after drying, contains 0.5% acrylate compounds. This fabric is then exposed along with a similarly dyed one not treated with the acrylate in an Atlas Fadeometer for 100 hours. The treated fabric shows little change whereas the other is severely degraded. The tensile strength of both samples before exposure is 21,000 lbs./in.². After exposure the untreated sample has a tensile strength of only 8000 lbs./in.² and the treated sample has a tensile strength of 19,600 lbs./in.².

*Example 2*

Example 1 is repeated employing the same fabric in an undyed state. Similar stabilization of the treated sample results as in Example 1. The standard breaking tenacity of the treated sample remains virtually unchanged (i.e., 1.3 grams/denier) whereas the untreated sample decreases to 0.6 grams/denier.

*Example 3*

Example 1 is repeated using a fabric of acetyl value of 59 (calculated as combined acetic acid). Similar improved results are obtained with the acrylate treated fabric.

*Example 4*

Examples 1 and 3 are repeated except that undyed fabrics are immersed in a bath containing 0.5% of Disperse Yellow 23 dyestuff, 0.1% of Monopol oil and 0.5% 2-ethylhexyl α-cyano-β-methyl-β-ethylacrylate and the dyeings done under pressure at 240° F. Excellent dyeings are obtained which are about twice the strength of similar dyeings without the acrylate. In addition the acrylate treated samples exhibit far better light fastness as well as improved resistance of the fiber to degradation as manifested by tensile strength and breaking tenacity tests.

*Example 5*

Example 4 is repeated using the following dyestuffs and acrylates:

| | Dyestuff | Acrylate |
|---|---|---|
| (a) | C.I. 62,500 | Example 1. |
| (b) | C.I. 11,190 | Do. |
| (c) | C.I. 62,500 | Ethyl-α-cyano-β-methyl-β-ethyl acrylate. |
| (d) | C.I. 11,190 | Do. |
| (e) | Example 1 | Do. |
| (f) | Example 4 | Do. |
| (g) | Example 1 | Ethyl-α-cyano-β,β-diethyl acrylate. |
| (h) | Example 4 | Do. |
| (i) | Example 5(a) | Do. |
| (j) | Example 5(b) | Do. |
| (k) | Example 1 | Ethyl-α-cyano-β,β-diisobutyl acrylate. |
| (l) | Example 4 | Do. |
| (m) | Example 1 | Ethyl-α-cyano-β,β-diisooctyl acrylate. |
| (n) | Example 4 | Do. |
| (o) | Example 1 | Ethyl-α-cyano-β-methyl-β-isooctyl acrylate. |
| (p) | Example 4 | Do. |
| (q) | Example 1 | Ethyl-α-cyano-β-isopropyl-β-n-dodecyl acrylate. |
| (r) | Example 4 | Do. |
| (s) | Example 5(a) | Do. |
| (t) | Example 1 | Hydroxyethyl-α-cyano-β,β-diethyl acrylate. |
| (u) | Example 4 | Do. |
| (v) | Example 1 | Cyanoethyl-α-cyano-β,β-diethyl acrylate. |
| (w) | Example 4 | Do. |
| (x) | Example 1 | Chloroethyl-α-cyano-β,β-diethyl acrylate. |
| (y) | Example 4 | Do. |
| (z) | Example 1 | Ethyl-α-cyano-β,β-diethyl methoxy acrylate. |
| (aa) | Example 4 | Carbomethoxyethyl-α-cyano-β,β-diethyl acrylate. |
| (bb) | Example 1 | Benzyl-α-cyano-β,β-diethyl acrylate. |
| (cc) | Example 4 | Do. |
| (dd) | Example 1 | (o-Chlorobenzyl)-α-cyano-β,β-diethyl acrylate. |
| (ee) | Example 4 | Do. |
| (ff) | Example 1 | Allyl-α-cyano-β,β-diethyl acrylate. |
| (gg) | Example 4 | Octadecyl-α-cyano-β,β-diethyl acrylate. |
| (hh) | Example 1 | Nonacosyl-α-cyano-β,β-diethyl acrylate. |
| (ii) | Example 4 | Crotyl-α-cyano-β,β-diethyl acrylate. |
| (jj) | Example 1 | Dodecenyl-2-α-cyano-β,β-diethyl acrylate. |
| (kk) | Example 4 | Phenoxyethyl-α-cyano-β,β-diethyl acrylate. |
| (ll) | Example 1 | 2-chlorallyl-α-cyano-β,β-diethyl acrylate. |
| (mm) | Example 1 | Phenethyl-α-cyano-β,β-diethyl acrylate. |

Excellent results are obtained comparable to those of Examples 1 and 4.

*Example 6*

Example 5 is repeated employing acrylate concentrations of 0.1%, 0.2%, 1%, 2% and 5%. Again, excellent results are obtained.

Other variations in an modifications of the described processes which will be obvious to those skilled in the art can be made in this invention without departing from the scope or spirit thereof.

We claim:
1. A method for improving the stability of cellulose acetate of an acetyl value of at least about 2.5 which comprises incorporating therewith from about 0.1% to about 5% by weight based on the weight of the cellulose acetate of a compound having the formula:

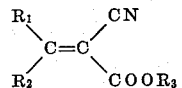

wherein $R_1$ and $R_2$ are alkyl of from 1 to about 12 carbon atoms and $R_3$ is a radical selected from the group consisting of alkyl of 1 to about 50 carbon atoms, alkenyl of 3 to about 50 carbon atoms, and the hydroxy, halo, alkoxy, cyano, carbalkoxy, aryloxy and aryl derivatives thereof.

2. A composition comprising cellulose acetate of an acetyl value of at least about 2.5 and from about 0.1% to about 5% by weight based on the weight of the cellulose acetate of a compound having the formula:

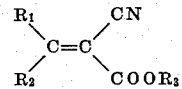

wherein $R_1$ and $R_2$ are an alkyl of from 1 to about 12 carbon atoms and $R_3$ is a radical selected from the group consisting of alkyl of 1 to about 50 carbon atoms, alkenyl of 3 to about 50 carbon atoms and the hydroxy, halo, alkoxy, cyano, carbalkoxy, aryloxy and aryl derivatives thereof.

3. A method for improving the stability of cellulose acetate of an acetyl value of at least about 2.5 which comprises treating cellulose acetate in an aqueous bath containing a compound of the formula:

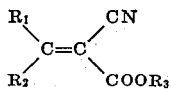

wherein $R_1$ and $R_2$ are an alkyl of from 1 to about 12 carbon atoms and $R_3$ is a radical selected from the group consisting of alkyl of 1 to about 50 carbon atoms, alkenyl of 3 to about 50 carbon atoms and the hydroxy, halo, alkoxy, cyano, carbalkoxy, aryloxy and aryl derivatives thereof, to incorporate from about 0.1% to about 5% by weight of said compound in said cellulose acetate.

4. A method as defined in claim 1 wherein $R_1$ and $R_2$ are methyl and $R_3$ is alkyl.

5. A method as defined in claim 4 wherein $R_3$ is ethyl.

6. A method as defined in claim 4 wherein $R_3$ is 2-ethyl hexyl.

7. A method as defined in claim 4 wherein $R_3$ is n-dodecyl.

8. A method as defined in claim 4 wherein $R_3$ is hydroxy alkyl.

9. A method as defined in claim 4 wherein $R_3$ is hydroxy ethyl.

10. A method as defined in claim 1 wherein $R_1$ is methyl, $R_2$ is ethyl and $R_3$ is alkyl.

11. A method as defined in claim 1 wherein $R_1$ is methyl, $R_2$ is ethyl and $R_3$ is 2-ethyl hexyl.

12. A method as defined in claim 1 wherein $R_1$ is methyl, $R_2$ is ethyl and $R_3$ is octadecyl.

13. A method as defined in claim 1 wherein $R_1$ is methyl, $R_2$ is isooctyl and $R_3$ is alkyl.

14. A method as defined in claim 1 wherein $R_1$ is methyl, $R_2$ is isooctyl and $R_3$ is ethyl.

15. A method as defined in claim 1 wherein $R_1$ and $R_2$ are isobutyl and $R_3$ is alkyl.

16. A method as defined in claim 1 wherein $R_1$ is methyl, $R_2$ is ethyl and $R_3$ is hydroxyalkyl.

17. A method as defined in claim 1 wherein $R_1$ is methyl, $R_2$ is ethyl and $R_3$ is cyanoalkyl.

18. A method as defined in claim 1 wherein $R_1$ is methyl, $R_2$ is ethyl and $R_3$ is haloalkyl.

19. A method as defined in claim 1 wherein $R_1$ is methyl, $R_2$ is ethyl and $R_3$ is aralkyl.

References Cited by the Examiner

UNITED STATES PATENTS

| | | | |
|---|---|---|---|
| 2,150,154 | 3/1939 | Cope | 260—464 |
| 2,904,581 | 9/1959 | Coraor et al. | 260—465.4 |

ALEXANDER H. BRODMERKEL, *Primary Examiner.*

J. H. WOO, *Assistant Examiner.*